July 9, 1929.　　　M. L. BEISTLE　　　1,719,962
DISPLAY HOLDER
Filed Oct. 26, 1927　　　2 Sheets-Sheet 1
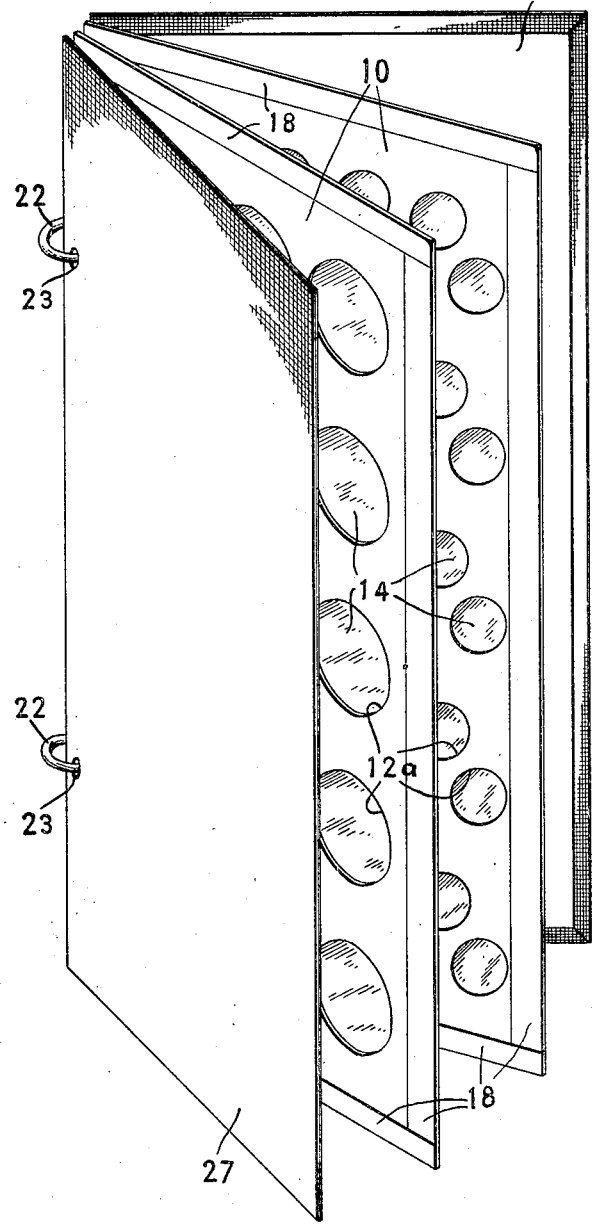
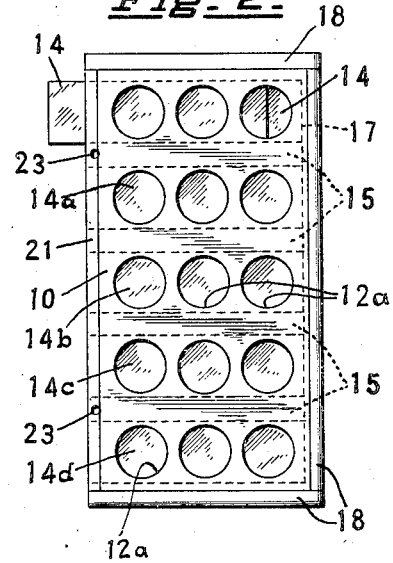
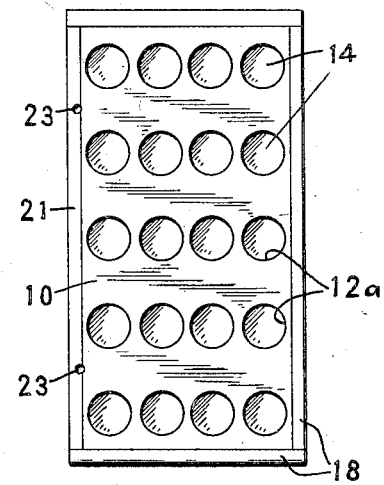

July 9, 1929.　　M. L. BEISTLE　　1,719,962
DISPLAY HOLDER
Filed Oct. 26, 1927　　2 Sheets-Sheet 2

Patented July 9, 1929.

1,719,962

UNITED STATES PATENT OFFICE.

MARTIN L. BEISTLE, OF SHIPPENSBURG, PENNSYLVANIA.

DISPLAY HOLDER.

Application filed October 26, 1927. Serial No. 228,721.

The subject of this invention is a new article of manufacture constituting a display device.

In its present preferred form, the device includes a sheet-like structure, well-adapted for hinge-connection to a plurality of its fellows to establish a book-like assemblage of said display devices; with each sheet-like structure including on opposite sides a number of spaced transparent "slider" sheets, normally pocketing therebetween one or more spacer sheets, such spacer sheets having a plurality of spaced openings cut therethrough, each opening to receive and detain an article of a certain size to expose the obverse of the article through one of such transparent sheets and to expose the reverse thereof though the other of said transparent sheets, when the appropriate transparent sheets are normally in place, that is, not slidably withdrawn to permit removal or insertion of a particular displayed article.

Each sheet-like structure is desirably bound marginally at certain edges. A plurality of said structures may be hinged together, and, as a result of such hinging, each display device is bound at a plurality of edge-points along the hinging edge, as securely as at said first-mentioned edges, whereby in turn easy surreptitious slipping out of a transparent slider sheet, to make accessible a detained coin, is prevented while a plurality of said sheet-like structures are assembled into such book-like assembly.

The invention mainly, however, aims to provide a sheet-like display device, whether or not the same is or is intended to be connected into a book-assemblage with a plurality of its fellows; whereby one or more of the following objects are attained:

(a) A display device including spacer and transparent sheet elements as above, with an outermost non-transparent cover sheet on one or both sides of the display device, such cover sheet having openings adapted to register with openings in the spacer sheet.

(b) A display device including transparent sheet elements as above, on opposite sides of the central spacer sheet, of rectangular-strip form, in combination with additional sheets, underlying the cover sheets, and between the transparent sheets, to guide and position the transparent slider sheets during the sliding in or out of one of the latter and on full insertion of the same in the display device.

(c) A display device as in (a) or (b), wherein the various sheet elements are so shaped and arranged that a predetermined plurality of transparent slider sheets is required completely to cover and insure housing of all the articles, so that when a display device is filled by such a plurality of transparent slider sheets and a predetermined total of detained articles, some particular ones of the articles may be exposed for removal from the device while others are left in place therein.

Various other objects and advantages of the invention than those hereinabove mentioned will be specifically pointed out or will be apparent hereinafter in the course of the below-detailed description of the forms of the invention shown, in the accompanying drawings, as preferred ones of the various possible embodiments of the invention; it being understood, naturally, that such forms are merely illustrative of some of the many possible combinations and arrangements of parts well calculated to attain the objects of the invention, and hence said detailed description of such forms is not to be taken as at all defining or limiting the invention itself. That is to say, the scope of protection contemplated is of course to be taken from the appended claims, interpreted as broadly as is consistent with the prior art.

In the accompanying drawings:

Fig. 1 is a perspective view, showing a plurality of sheet-like structures formed into a book-assemblage as above;

Fig. 2 shows, in front elevation, one form of sheet-like structure according to the invention;

Fig. 3 is a view similar to Fig. 2, illustrating a variant form;

Similar reference characters refer to similar parts throughout the several views of the drawings.

Figure 4:
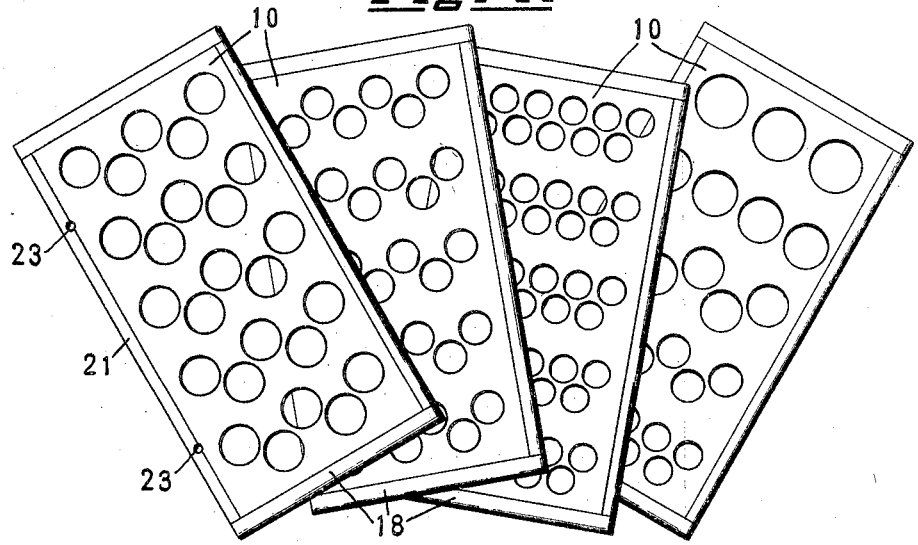
Fig. 4 shows a scattered collection of loose sheet-like structures, the openings in certain sheet elements of which are adapted for coins of different sizes.
Figure 5:
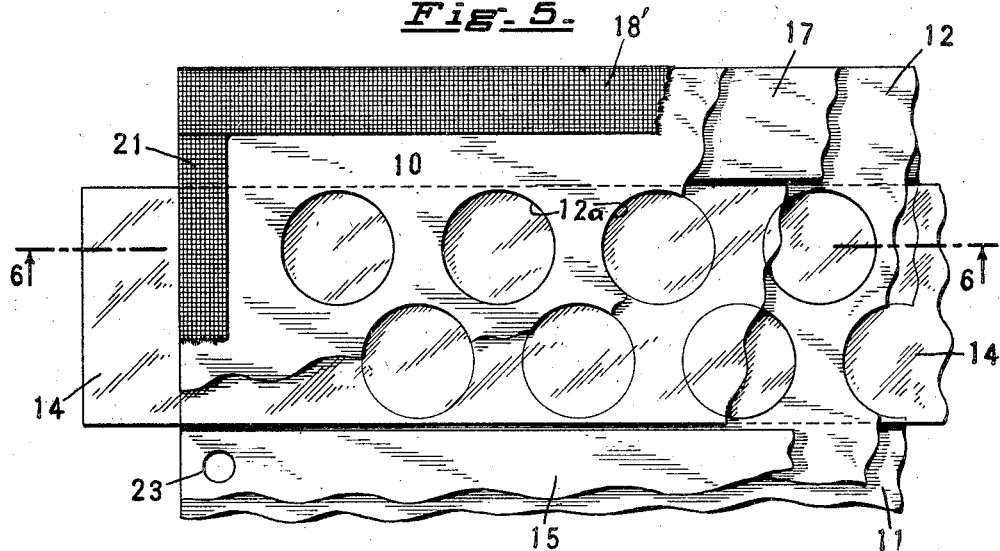
Fig. 5 is an enlarged fragmentary detail view, showing certain of the parts at the top of Fig. 1 broken away to expose clearly underlying parts.
Figure 6:
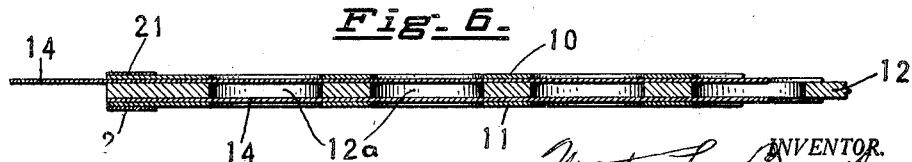
Fig. 6 is a transverse sectional view, taken on the line 6—6 of Fig. 5.

Each of the sheet-like structures shown in the drawings, is desirably of the construction illustrated in Figs. 2, 5 and 6, to the extent that a flat pocket is provided between a spaced pair of non-transparent cover sheets 10 and 11. Such pocket is of a thickness to house a spacer sheet 12 having a plurality of through-openings $12^a$ for receiving and detaining coins or other articles of appropriate sizes, so as to expose the obverse and reverse sides of each such article through transparent sheets when the said transparent sheets are properly arranged outwardly of the spacer sheet and underlying the cover sheets 10 and 11.

As clearly shown in the drawings, the cover sheets 10 and 11 have openings registering with the openings $12^a$ of the spacer sheet 12.

The form of transparent slider sheet here shown is marked 14 (Figs. 2, 5 and 6); such form of slider sheet being of a size and shape such that, when fully home (see bottom of Fig. 6), it covers a particular row of display openings. Thus, in the present case, these fractional slider sheets, as they will be called, are strips, as clearly shown in Fig. 2, where other strips of the series are marked $14^a$, $14^b$, $14^c$ and $14^d$. The slider sheets 14 and $14^a$, $14^b$, $14^c$ and $14^d$ are illustrated as being alternated in location with fixed or permanently incorporated additional or guide-ledge sheets 15.

An edge-placed guide-sheet is also recommended as indicated at 17 in Figs. 2 and 5.

Each display device is built up, for use with the independently insertable and withdrawable slider sheets 14, which may well be of celluloid, of the elements described; after which all the parts except the slider sheets 14 are permanently secured together by the application of suitable edge-securing or binding means, as spaced staples (not shown), and/or adhesively applied tape as illustrated. This tape 18, along all the edge portions of the sheet-like structure except one, which latter edge portion is provided to establish a slip-in or slip-out mouth for the transparent slider-sheets 14, is here creased at its middle and applied and secured adhesively in position with a flap turned down flat against an outer cover sheet 10 or 11, the visible one of such flaps being marked 18' in Fig. 5.

If desired, the tape just referred to may be applied also along the edges of the outermost sheets of the sheet-like structure, as at 21; but simply as a flat tape layer, in order not permanently to close the mouths of the slide-pockets for the sheets 14. Cross-compare Figs. 5 and 6.

The non-transparent cover sheets 10 and 11 are preferably of white paper or light cardboard of the proper thickness.

An anti-theft means, of a kind to defeat easy surreptitious removal of a coin, is easily provided, according to the present invention, if the collector's set of sheet-like structures are suitably hinged together, along the edge portions establishing the mouths of their pockets; for instance, by the rings 22 passing through apertures 23, as shown.

Book-cover elements as indicated at 27 may or may not be used, of course; but, if used, their perforations 23 match the perforations 23 in the sheet-like structures.

I claim:

1. A display device comprising a holder having a plurality of rows of display apertures formed therethrough, and a transparent slide removably mounted on the holder and covering only a part of the rows of the display apertures.

2. A display device comprising a holder, a plurality of transparent slides removably mounted in opposed pairs on the two sides of the holder, the holder being formed with a plurality of display apertures opposite each pair of slides.

3. A display device comprising a holder, a cover member secured to each side of the holder, a plurality of transparent slides removably mounted between each cover and the holder, the holder and covers being formed with display apertures in alinement with opposite slides.

4. A display device comprising a holder, a cover member secured to each side of the holder, a plurality of transparent slides removably mounted between each cover and the holder, a spacer permanently mounted on the holder between adjacent slides, the holder and covers being formed with display apertures in alinement with opposite slides.

5. A display device comprising a holder, a cover member secured to each side of the holder, a plurality of spacers secured between each cover and the holder and forming a plurality of pockets on each side of the holder, and a transparent slide removably mounted in each pocket.

6. A display device comprising a holder, a cover member secured to each side of the holder, a plurality of spacers secured between each cover and the holder and forming a plurality of pockets on each side of the holder, a transparent slide removably mounted in each pocket, the holder and covers being formed with display apertures in alinement with opposite slides.

7. A display device comprising a rectangular holder, a cover member secured to each side of the holder, a pluarlity of spacers secured between each cover and the holder and forming a plurality of pockets on each side of the holder, a binding surrounding the edges of the covers and holder along three sides of the display device, a transparent slide mounted in each pocket, the holder and covers being formed with display apertures in alinement with opposite slides.

8. A display device for coins and similar objects, comprising a holder-sheet of substantial thickness having a plurality of rows of object-receiving apertures formed therethrough, transparent means at one side of the holder-sheet and covering the apertures, and a transparent sheet slidably mounted at the other side of the holder-sheet and covering only a part of the rows of the display apertures.

9. A display device for coins and similar objects, comprising a holder-sheet of substantial thickness having a plurality of rows of object-receiving apertures formed therethrough, means at one side of the holder-sheet covering the apertures, and a transparent sheet slidably mounted at the other side of the holder-sheet and covering only a part of the rows of the display apertures.

In testimony whereof I affix my signature.

MARTIN L. BEISTLE.